US012512254B2

United States Patent
Xu

(12) United States Patent
(10) Patent No.: US 12,512,254 B2
(45) Date of Patent: Dec. 30, 2025

(54) MAGNETIC MODULE AND ELECTRICAL CONNECTOR INCLUDING THE MAGNETIC MODULE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Yong-Chun Xu, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 964 days.

(21) Appl. No.: 17/570,667

(22) Filed: Jan. 7, 2022

(65) Prior Publication Data

US 2022/0216000 A1 Jul. 7, 2022

(30) Foreign Application Priority Data

Jan. 7, 2021 (CN) ......................... 202110018896.6

(51) Int. Cl.
*H01F 30/16* (2006.01)
*H01F 27/24* (2006.01)
*H01F 27/28* (2006.01)
*H01R 13/66* (2006.01)

(52) U.S. Cl.
CPC ......... *H01F 27/2823* (2013.01); *H01F 27/24* (2013.01); *H01F 30/16* (2013.01); *H01R 13/6633* (2013.01)

(58) Field of Classification Search
CPC ...... H01F 27/2823; H01F 27/24; H01F 30/16; H01F 19/04; H01F 27/2895; H01F 2027/2838; H01F 27/29; H01R 13/6633; H01R 24/64; H01R 13/719
See application file for complete search history.

(56) References Cited

U.S. PATENT DOCUMENTS 10,236,114 B2 3/2019 Xu et al.
10,483,697 B2 11/2019 Foxconn
2007/0040645 A1* 2/2007 Sedio ...................... H01F 30/16 336/232
2017/0330679 A1* 11/2017 Xu ...................... H01F 27/2895
2018/0248320 A1* 8/2018 Xu ..................... H01R 13/6633

FOREIGN PATENT DOCUMENTS

CN 102832019 12/2012
CN 105703155 A * 6/2016

* cited by examiner

*Primary Examiner* — Tuyen T Nguyen
(74) *Attorney, Agent, or Firm* — Ming Chieh Chang

(57) ABSTRACT

A magnetic module includes: a magnetic core; and plural enameled wires wound on the magnetic core, the enameled wire being wound on the magnetic core to form a primary coil and a secondary coil, the primary coil forming a primary input end, a primary output end, and a primary center tap, the secondary coil forming a secondary input end, a secondary output end, and a secondary center tap, wherein one of the primary coil and the secondary coil includes four groups of enameled wires, and the other includes one group of enameled wires.

11 Claims, 4 Drawing Sheets

MAGNETIC MODULE AND ELECTRICAL CONNECTOR INCLUDING THE MAGNETIC MODULE

CROSS-REFERENCE TO RELATED APPLICATIONS

This patent application relates to U.S. patent application Ser. No. 17/476,366, filed on Sep. 15, 2021, entitled "MAGNETIC MODULE AND ELECTRICAL CONNECTOR INCLUDING THE MAGNETIC MODULE" and U.S. patent application Ser. No. 17/570,653, filed on Jan. 7, 2022, entitled "MAGNETIC MODULE AND METHOD OF MAKING THE SAME AND ELECTRICAL CONNECTOR INCLUDING THE MAGNETIC MODULE," which are assigned to the same assignee as this application.

BACKGROUND OF THE INVENTION

1. Field of the Invention

The present invention relates generally to a magnetic module and an electrical connector including the magnetic module, and more particularly to the distribution of the coil enameled wire of the magnetic module.

2. Description of Related Arts

China Patent No. 102832019 discloses a magnetic module including a magnetic core, a primary coil and a secondary coil wound on the magnetic core, each input end and output end of the primary coil and the secondary coil has two wire, and the resistance of each input end and output end is relatively large, which cannot guarantee the effective transmission of high-frequency signal transmission.

SUMMARY OF THE INVENTION

A main object of the present invention is to provide a magnetic module suitable for high-frequency signal transmission.

To achieve the above-mentioned object, a magnetic module comprises: a magnetic core; and a plurality of enameled wires wound on the magnetic core, the enameled wire being wound on the magnetic core to form a primary coil and a secondary coil, the primary coil forming a primary input end, a primary output end, and a primary center tap, the secondary coil forming a secondary input end, a secondary output end, and a secondary center tap, wherein one of the primary coil and the secondary coil includes four groups of enameled wires, and the other includes one group of enameled wires.

To achieve the above-mentioned object, an electrical connector comprises a magnetic module, the magnetic module comprising: a magnetic core; and a plurality of enameled wires wound on the magnetic core, the enameled wire being wound on the magnetic core to form a primary coil and a secondary coil, the primary coil forming a primary input end, a primary output end, and a primary center tap, the secondary coil forming a secondary input end, a secondary output end, and a secondary center tap, wherein one of the primary coil and the secondary coil includes four groups of enameled wires, and the other includes one group of enameled wires, and the electrical connector can support 25 Gbps.

Compared to prior art, one of the primary coil and the secondary coil includes four groups of enameled wires, and the other includes one group of enameled wires, through reasonable distribution of enameled wires, to ensure the effective transmission of high-frequency signals.

DETAILED DESCRIPTION OF THE PREFERRED EMBODIMENT

Figure 1:
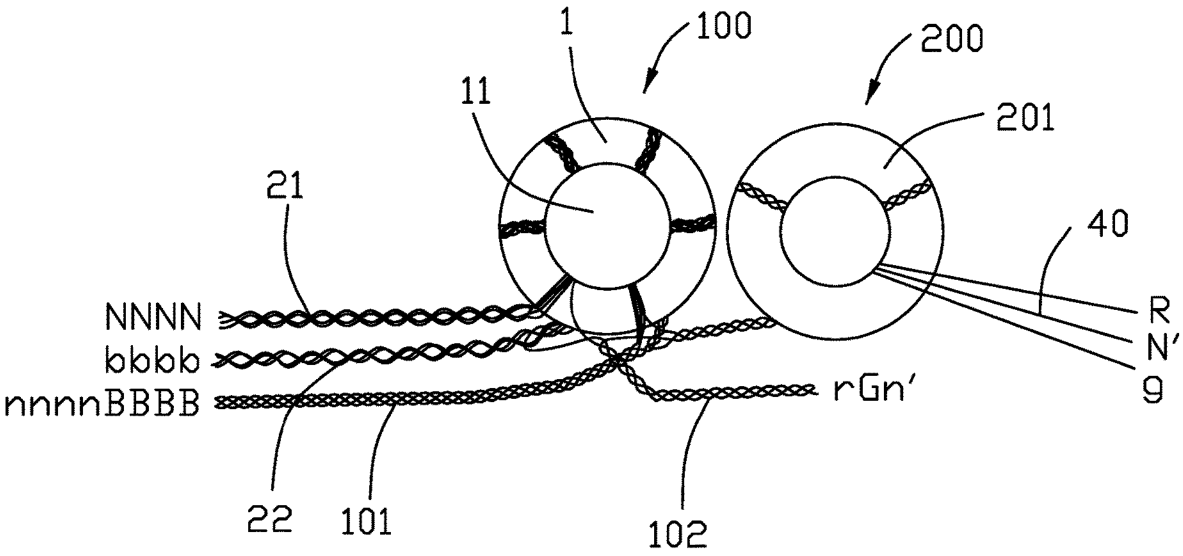
FIG. 1 is a schematic diagram of magnetic module in accordance with the present invention and common mode choke coil connected with it.
Figure 2:
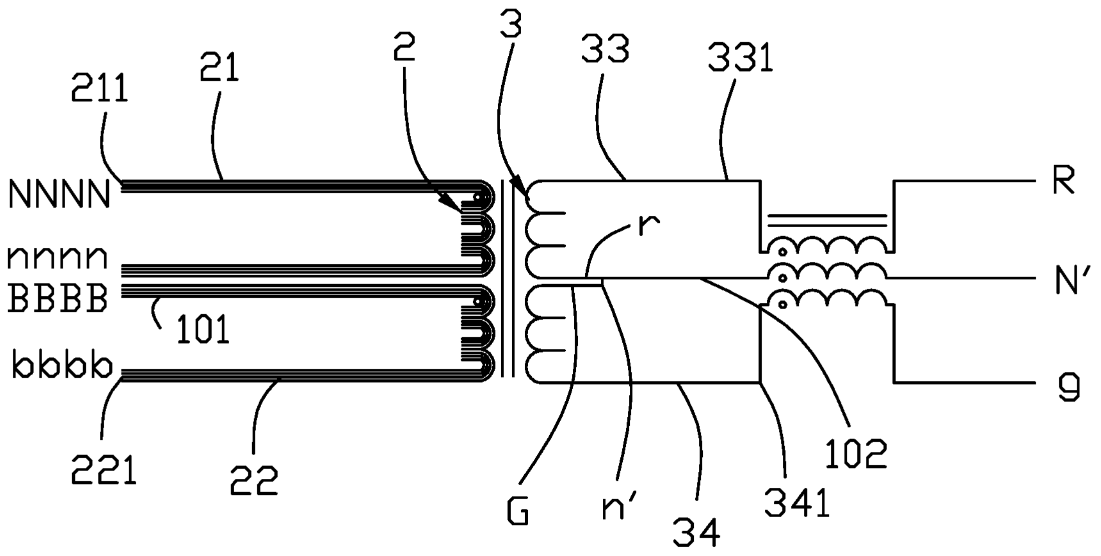
FIG. 2 is a circuit schematic of the magnetic module and the common mode choke coil connected to it in FIG. 1.
Figure 3:
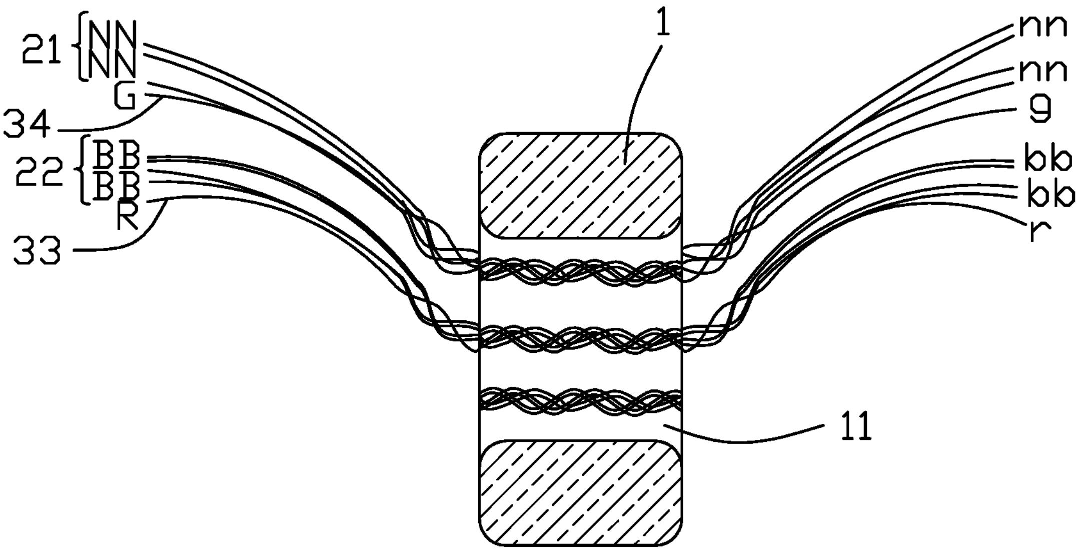
FIG. 3 is a schematic diagram of the wire ends spreading out after the magnetic module is wound in FIG. 1.

Referring to FIGS. 1-4, a magnetic module 100 in accordance with the present invention is shown. The magnetic module 100 is actually a transformer. The magnetic module 100 includes a toroid or magnetic core 1 and a plurality of enameled wires wound on the magnetic core 1. The enameled wire is wound on the magnetic core 1 to form a primary coil 2 and a secondary coil 3 of the magnetic module 100.

One of the primary coil 2 and the secondary coil 3 includes four groups of enameled wires, and the other includes one group of enameled wires. Specifically, in this embodiment, the primary coil 2 has four groups of enameled wires, and the secondary coil 3 has one group of enameled wires. The magnetic module can support 6.25 Gbps signal transmission. The primary coil 2 includes a primary center tap 101, and the secondary coil 3 includes a secondary center tap 102.

The magnetic core 1 has a circular ring shape with a central through hole or an oval shape with two through holes. Specifically, in this embodiment, the magnetic core 1 is a toroidal magnetic core 1 provided with a central through hole 11. The primary coil 2 includes a first group of enameled wires 21 and a second group of enameled wires 22. The first group of enameled wires 21 and the second group of enameled wires 22 respectively form the primary input end 211 and the primary output end 221 of the primary coil 2, and a primary center tap 101 is formed between the primary input end 211 and the primary output end 221. The secondary coil 3 includes a third group of enameled wires 33 and a fourth group of enameled wires 34. The third group of enameled wires 33 and the fourth group of enameled wires 34 respectively form the secondary input end 331 and the secondary output end 341 of the secondary coil 3, and form the secondary center tap 102. Each of the first group of enameled wires 21 and the second group of enameled wires 22 has four enameled wires, and each of the third group of enameled wires 33 and the fourth group of enameled wires 34 has only one enameled wire. The diameter of each of the first group of enameled wires 21, the diameter of each of the second group of enameled wires 22, the diameter of each of the third group of enameled wires 33, and the diameter of each of the fourth group of enameled wires 34 are the same. The respective parts of the first group of enameled wires 21, the second group of enameled wires 22, the third group of enameled wires 33, and the fourth group of enameled wires 34 wound around the magnetic core 1 are twisted together, and are wound around the magnetic core 1 in a manner that penetrates the central through hole 11, and expose the ends of each group of enameled wires.

Each enameled wire has a first thread and a second thread. The first group of enameled wire 21 is natural. Each enameled wire in the first group of enameled wires 21 comprises a first thread N and a second thread n. The second group of enameled wire 22 is blue. Each enameled wire in the second group of enameled wires 22 comprises a first thread B and a second thread b. The third group of enameled wire 33 is red. Each enameled wire in the third group of enameled wires 33 comprises a first thread R and a second thread r. The fourth group of enameled wire 34 is green. Each enameled wire in the fourth group of enameled wires 34 comprises a first thread G and a second thread g. The color of the enameled wire is just for easy distinction, and other colors can also be used instead.

The first thread NNNN of the four enameled wires of the first group of enameled wires 21 collectively serves as the primary input end 211 of the primary coil 2 of the transformer. The second thread nnnn of the first group of enameled wires 21 and the first thread BBBB of the second group of enameled wires 22 together form the first center tap 101. The second thread bbbb of the four enameled wires of the second group of enameled wires 22 are collectively used as the primary output end 221 of the primary coil 2 of the transformer. The first thread R of the enameled wire of the third group of enameled wires 33 is used as the secondary input end 331 of the transformer secondary coil 3. The second thread g of the fourth group of enameled wire 34 is the secondary output end 341 of the transformer secondary coil 3. The second thread r of the third group of enameled wires 33 and the first thread G of the fourth group of enameled wires 34 together form the second center tap 102. The first center tap 101 is twisted into one bundle, and the second center tap 102 is twisted into another bundle. The first center tap 101 extends to be electrically connected to external components. The tail end of the second center tap 102 is immersed in tin and short-circuited. The distance between the part of the immersed in tin of the secondary center tap 102 and the magnetic core is not more than 1.1 mm.

Figure 4:
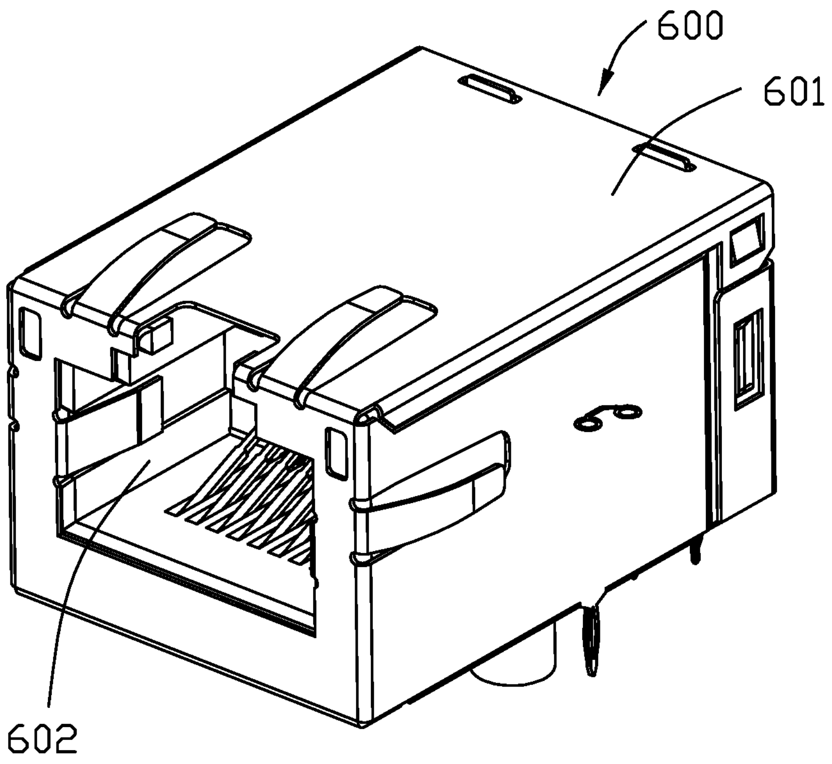
FIG. 4 is a perspective view of an electrical connector including the magnetic module in FIG. 3.

Referring to FIG. 4, an electrical connector 600 in accordance with the present invention includes a housing 601, an insulating body 602 housed in the housing 601, and a magnetic module 100 housed in the housing 601. The electrical connector 600 also includes a common mode choke 200. The common mode choke coil 200 includes common mode core 201. Add a natural enameled wire 40, which includes the first thread N' and the second thread n'. Twist the natural wire 40 with the third group of enameled wires 33 and the fourth group of enameled wires 34 and wind it around the common mode core 201 to form windings RgN' and rGn'. The electrical connector 600 includes four magnetic modules 100, and the electrical connector 600 can support 25 Gbps signal transmission.

In the present invention, one of the primary coil and the secondary coil includes four groups of enameled wires, and the other includes one group of enameled wires, so that the coil with four groups of enameled wires has a lower resistance, by reasonably distributing the enameled wire, in order to achieve the purpose of transmitting high-frequency signals.

What is claimed is:

1. A magnetic module comprising:

a magnetic core; and a plurality of enameled wires wound on the magnetic core to form a primary coil and a secondary coil, the primary coil forming a primary input end, a primary output end, and a primary center tap, the secondary coil forming a secondary input end, a secondary output end, and a secondary center tap, wherein the primary coil includes a first group of four enameled wires and a second group of four enameled wires, and the secondary coil includes a third group of one enameled wire and a fourth group of one enameled wire.

2. The magnetic module as claimed in claim 1, wherein each enameled wire of the first through fourth groups of enameled wires, each of the second group of enameled wires, each of the third group of enameled wires has same diameter.

3. The magnetic module as claimed in claim 1, wherein a tail end of the secondary center tap is connected by immersion in tin.

4. The magnetic module as claimed in claim 3, wherein a distance between the tail end of the secondary center tap and the magnetic core is not more than 1.1 mm.

5. The magnetic module as claimed in claim 1, wherein respective parts of the first through fourth groups of enameled wires wound around the magnetic core are twisted together.

6. The magnetic module as claimed in claim 1, wherein the magnetic core is an annular magnetic core with a central through hole or an elliptical magnetic core with two through holes.

7. An electrical connector comprising a magnetic module, the magnetic module comprising:

a magnetic core; and a plurality of enameled wires wound on the magnetic core to form a primary coil and a secondary coil, the primary coil forming a primary input end, a primary output end, and a primary center tap, the secondary coil forming a secondary input end, a secondary output end, and a secondary center tap, wherein the primary coil includes a first group of four enameled wires and a second group of four enameled wires, the secondary coil includes a third group of one enameled wire and a fourth group of one enameled wire, and the electrical connector is able to support 25 Gbps.

8. The magnetic module as claimed in claim 1, wherein the first group of four enameled wires and the second group of four enameled wires respectively form the primary input end and the primary output end of the primary coil, and the primary center tap is formed between the primary input end and the primary output end.

9. The magnetic module as claimed in claim 1, wherein the third group of one enameled wire and the fourth group of one enameled wire respectively form the secondary input end and the secondary output end of the secondary coil, and the secondary center tap is formed between the secondary input end and the secondary output end.

10. The electrical connector as claimed in claim 7, wherein the first group of four enameled wires and the second group of four enameled wires respectively form the primary input end and the primary output end of the primary coil, and the primary center tap is formed between the primary input end and the primary output end.

11. The electrical connector as claimed in claim 7, wherein the third group of one enameled wire and the fourth group of one enameled wire respectively form the secondary input end and the secondary output end of the secondary coil, and the secondary center tap is formed between the secondary input end and the secondary output end.

* * * * *